United States Patent
Luo et al.

(10) Patent No.: US 11,937,352 B2
(45) Date of Patent: Mar. 19, 2024

(54) MOSFET CIRCUIT, FOR EXAMPLE FOR USE IN A TAPPED LINEAR DRIVER, AND SURGE PROTECTION METHOD

(71) Applicant: SIGNIFY HOLDING B.V., Eindhoven (NL)

(72) Inventors: Chenghu Luo, Shanghai (CN); Shaowei Han, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 213 days.

(21) Appl. No.: 17/634,063

(22) PCT Filed: Aug. 7, 2020

(86) PCT No.: PCT/EP2020/072219
§ 371 (c)(1),
(2) Date: Feb. 9, 2022

(87) PCT Pub. No.: WO2021/028330
PCT Pub. Date: Feb. 18, 2021

(65) Prior Publication Data
US 2022/0353971 A1 Nov. 3, 2022

(30) Foreign Application Priority Data

Aug. 12, 2019 (WO) ................ PCT/CN2019/100214
Nov. 18, 2019 (EP) ..................................... 19209749

(51) Int. Cl.
*H05B 45/48* (2020.01)
*H02H 9/02* (2006.01)
(Continued)

(52) U.S. Cl.
CPC ............ *H05B 45/48* (2020.01); *H02H 9/025* (2013.01); *H02H 9/042* (2013.01); *H05B 45/395* (2020.01); *H05B 45/54* (2020.01)

(58) Field of Classification Search
CPC ...... H05B 45/48; H05B 45/395; H05B 45/54; H05B 47/24; H02H 9/025; H02H 9/042; Y02B 20/30; H02M 1/08; H02M 1/088
See application file for complete search history.

(56) References Cited

U.S. PATENT DOCUMENTS 6,888,711 B2   5/2005   Kohno
8,773,038 B2   7/2014   Logiudice
(Continued)

FOREIGN PATENT DOCUMENTS

WO       2017012835 A1      1/2017
WO   WO-2020032062 A1 *    2/2020

OTHER PUBLICATIONS

Translation of WO-2020032062-A1, Kataoka (Year: 2020).*

*Primary Examiner* — Renan Luque

(57) ABSTRACT

A MOSFET circuit clamps a MOSFET gate voltage (either directly or via a gate control circuit) when the source voltage exceeds a threshold level, for example in response to a voltage surge event between the source and drain. In particular, the gate is held at a voltage relative to the source, to turn off the first MOSFET during such a surge event, but not during normal operation. This provides automatic protection against unwanted increases in the input voltage, especially when the MOSFET was in its on state during the switching. A threshold circuit is connected between a gate (or gate control node) and a reference voltage. When the voltage at the source exceeds a voltage threshold level, it conduct a unidirectional circuit component (D18) between the source and gate (or gate control node), and the threshold circuit.

15 Claims, 7 Drawing Sheets

(51) Int. Cl.
*H02H 9/04* (2006.01)
*H05B 45/395* (2020.01)
*H05B 45/54* (2020.01)

(56) References Cited

U.S. PATENT DOCUMENTS

2010/0134018 A1 6/2010 Tziony et al.
2014/0265861 A1 9/2014 Pregitzer et al.
2017/0272069 A1* 9/2017 Chisaka ............. H03K 17/0822

* cited by examiner

MOSFET CIRCUIT, FOR EXAMPLE FOR USE IN A TAPPED LINEAR DRIVER, AND SURGE PROTECTION METHOD

CROSS-REFERENCE TO PRIOR APPLICATIONS

This application is the U.S. National Phase application under 35 U.S.C. § 371 of International Application No. PCT/EP2020/072219, filed on Aug. 7, 2020, which claims the benefits of European Patent Application No. 19209749.1, filed on Nov. 18, 2019 and Chinese Patent Application No. PCT/CN2019/100214, filed on Aug. 12, 2019. These applications are hereby incorporated by reference herein.

FIELD OF THE INVENTION

This invention relates to MOSFET circuits generally, and is of particular interest for tapped linear driver circuits, for example for driving an LED lighting load.

BACKGROUND OF THE INVENTION

Tapped-linear drivers (TLDs) for LEDs are well known. Unlike switch mode drivers, they do not contain high-frequency switching elements that deteriorate the electromagnetic interference (EMI) performance of the driver.

In a stacked arrangement, the LEDs to be driven are arranged in a series string, with sections of the string selectively bypassed by respective bypass switches. Each section typically comprises a series of individual LEDs. The switching operations aim to match the mains voltage at different points in time during the mains period with the required LED forward voltage. By doing so, the TLD maintains a high efficiency that is comparable to a switch mode driver.

Many topologies for TLDs are known. Typically, a rectifier is provided at the input for providing a fully rectified input to the TLD.

The basic stacked topology uses a single current source, and has bypass switches around respective LEDs or groups of LEDs.

The control of the bypass switches may be achieved using voltage-based control. This involves measuring the instantaneous input voltage and controlling the switches so that the input voltage and the LED voltages are matched. Alternatively, current-based control of the switches is based on the principle that the switches are normally closed, and only open when a current exceeds a certain pre-set level.

A problem arises in the event of a voltage surge at the input to a TLD, and when there is a surge event for MOSFET circuits generally. The surge event gives rise to increased voltages at the circuit nodes, and these increased voltages need to be tolerated by the circuit components, such as the MOSFET or MOSFETs.

It would be desirable to be able to tolerate surge events with lower rated components.

US20140265861A1 discloses a MOSFET and a surge control circuit, wherein the surge control circuit detects the input voltage on the BUS to turn off the MOSFET.

SUMMARY OF THE INVENTION

It is a concept of the invention to provide a MOSFET circuit which clamps a MOSFET gate voltage to turn it off when the source voltage exceeds a threshold level (meaning the MOSFET was on), for example in response to a voltage surge event between the source and drain. Therefore the surge voltage would not apply across the MOSFET and the MOSFET is protected. In one particular example of NMOS, the gate is held at a voltage below the voltage at the source, to turn off the MOSFET during such a surge event, but not during normal operation. This provides automatic protection against unwanted increases in the input voltage.

The invention is defined by the claims.

According to the invention, there is provided a MOSFET circuit, comprising:

a first MOSFET comprising a drain connected to an input voltage, a gate and a source;

a unidirectional circuit component connected between the source and a gate control node, which gate control node controls the switching of the first MOSFET using the gate; and a threshold circuit connected between the gate control node and a reference voltage, wherein the threshold circuit is adapted to clamp the voltage at the gate control node to a clamping voltage level when the voltage at the source exceeds a voltage threshold level and forward conducts the unidirectional circuit component and the threshold circuit, thereby holding the gate control node at a voltage such as to turn off the first MOSFET.

This MOSFET circuit provides protection against unwanted increases in the input voltage. When the MOSFET is turned on, the source voltage will rise in response to the input voltage increase. To protect the MOSFET from these increased voltages, the MOSFET is automatically turned off. This happens when the voltage at the source is sufficiently high that the unidirectional circuit component conducts, because the gate control node has reached the clamping voltage level of the threshold circuit. This turns the MOSFET off, for example, in the case of an n-channel MOSFET, by holding the gate below the source voltage. Thus, by clamping the gate voltage, the source voltage is clamped and the MOSFET is turned off.

In this way, the voltages (or voltage differences) to which the MOSFET are exposed can be reduced. This means that lower voltage components may be used.

In an embodiment, said threshold circuit (D17, R4, D13) is decoupled from the input voltage. This embodiment excludes the surge protection based on input voltage detection.

The unidirectional circuit component is for example connected in its forward conduction direction between the source and the gate control node, wherein the threshold circuit is adapted to clamp the voltage at the gate control node to a clamping voltage level when the voltage at the source exceeds a voltage threshold level, by enabling forward conduction through the unidirectional circuit component from the source to the gate control node.

This unidirectional circuit component thus provides a conduction path from the source to the gate control node, when the source voltage increases beyond the maximum gate control node voltage imposed by the threshold circuit.

In a first set of examples, the first MOSFET is n-channel and the gate control node is the gate, wherein conduction through the unidirectional circuit component and conduction of the threshold circuit holds the gate at a voltage below the voltage at the source. Thus, the gate can be pulled low to turn off the n-channel MOSFET.

In a second set of examples, the first MOSFET is p-channel, and wherein the first MOSFET has a gate drive circuit comprising an n-channel gate drive MOSFET, wherein the gate control node is the gate of the gate drive MOSFET, wherein conduction through the unidirectional circuit component and conduction of the threshold circuit turns off the gate drive MOSFET, thereby to turn off the first MOSFET.

Pulling down the gate of a p-channel MOSFET will turn the transistor on. Thus, a gate drive circuit is used so that a pulled down voltage can be used to turn off the p-channel MOSFET. The gate drive MOSFET functions as an inverter.

The unidirectional circuit component may comprise a diode.

This diode provides a conduction path between the source and the gate control node, when the source voltage increases beyond the maximum gate control node voltage imposed by the threshold circuit.

The threshold circuit may be adapted to clamp the voltage at the gate control node in response to a surge event of the input voltage. Thus, the MOSFET does not need to withstand the voltage of a maximum tolerated surge event.

The threshold circuit for example comprises a Zener diode. The threshold circuit may also comprise a current limiting resistor in series with the Zener diode. The current limiting resistor protects the components of the threshold circuit.

The circuit for example comprises a series connection of a plurality of MOSFETs including the first MOSFET, wherein the circuit comprises a plurality of unidirectional circuit components, each connected in their forward conduction direction from the source to the gate control node of a respective one of the MOSFETs, wherein the threshold circuit is connected between the gate control node of each MOSFET and the reference voltage, and wherein the threshold circuit is adapted to clamp the voltage at the gate control node of each MOSFET to the clamping voltage level when the voltage at the source of the respective MOSFET exceeds a respective voltage threshold level, thereby enabling forward conduction through the respective unidirectional circuit component and conduction of the threshold circuit, and thereby to turn off the respective MOSFET.

The threshold circuit in this case enables an increase in input voltage to be shared across the multiple MOSFETs, so that the voltage handling capability of each individual MOSFET can be further reduced.

The threshold circuit may comprise a shared Zener diode which is connected to the gate control node of each MOSFET through a respective further unidirectional circuit component.

The further unidirectional circuit components (e.g. diodes) provide isolation between the gates, so that the MOSFETs may be independently driven. However the threshold circuit uses a shared Zener diode for setting the clamping voltage. Thus, the additional circuit overhead is kept to a low level.

The invention also provides a tapped linear LED driver, comprising:
a LED string comprising a set of LED sections in series;
a MOSFET circuit as defined above, wherein each LED section is associated with a respective one of the MOSFETs, wherein each MOSFET provides a bypass current path for the associated LED section; and
a controller for controlling the gate voltages of the MOSFETs in dependence on an instantaneous amplitude of the input voltage, in order to bypass at least one of the LED sections to present a forward voltage of the not-bypassed LED sections matching the instantaneous amplitude of the input voltage.

A tapped linear driver (TLD), in particular a binary TLD, is one preferred use of the MOSFET circuit.

The tapped linear LED driver may further comprise a respective capacitor in parallel with each LED section, and a diode between the associated MOSFET and the parallel circuit of the capacitor and LED section.

The tapped linear LED driver may further comprise a rectifier, wherein the rectifier comprises an input for receiving an AC voltage and an output of the rectifier output comprises the input voltage for the MOSFET circuit.

The input voltage is thus a rectified AC signal. It has a voltage which varies over time. The controller controls the MOSFETs, and hence the bypass functions, in dependence on the level of this input voltage, corresponding to a particular phase of the prerectified AC input, in known manner.

The tapped linear LED driver may further comprise a current source circuit in series with the LED string, wherein the controller is further for controlling the current source circuit. A capacitor arrangement is for example between the input voltage and ground.

This capacitor arrangement provides improved electromagnetic compatibility (EMC) by allowing an instantaneous surge current to be absorbed and hence diverted from the MOSFETs.

The capacitor arrangement may comprise a first capacitor in a parallel with the whole LED string and a second capacitor in parallel with the current source circuit.

The first capacitor provides improved electromagnetic compatibility (EMC) by allowing an instantaneous surge current to be absorbed and hence diverted from the MOSFETs. The second capacitor functions as a voltage divider with the first capacitor, thereby setting a voltage across the current source when there is a surge event. The second capacitor may also improve EMC and reduce total harmonic distortion.

The invention also provides a surge protection method for a MOSFET circuit, wherein the MOSFET circuit comprises:
a first MOSFET comprising a drain connected to an input voltage, a gate and a source;
a unidirectional circuit component connected between the source and a gate control node, which gate control node controls the switching of the first MOSFET using the gate; and
a threshold circuit connected between the gate control node and a reference voltage,
wherein the method comprises:
performing voltage clamping of the voltage at the gate control node to a clamping voltage level, using the threshold circuit, when the voltage at the source exceeds a threshold voltage level and forward conducts the unidirectional circuit component between the source and the gate control node and the threshold circuit, thereby holding the gate control node at a voltage such as to turn off the first MOSFET.

This is the method implemented by the MOSFET circuit defined above.

The surge protection may be applied to a tapped linear LED driver, wherein the tapped linear driver comprises an LED string comprising a set of LED sections, wherein each LED section is associated with a respective MOSFET of the MOSFET circuit, and wherein the method comprises performing voltage clamping of the voltage at the gate control node of each MOSFET to the clamping voltage level when the voltage at the source of the respective MOSFET exceeds a respective threshold voltage level in case of an surge event in the input voltage.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
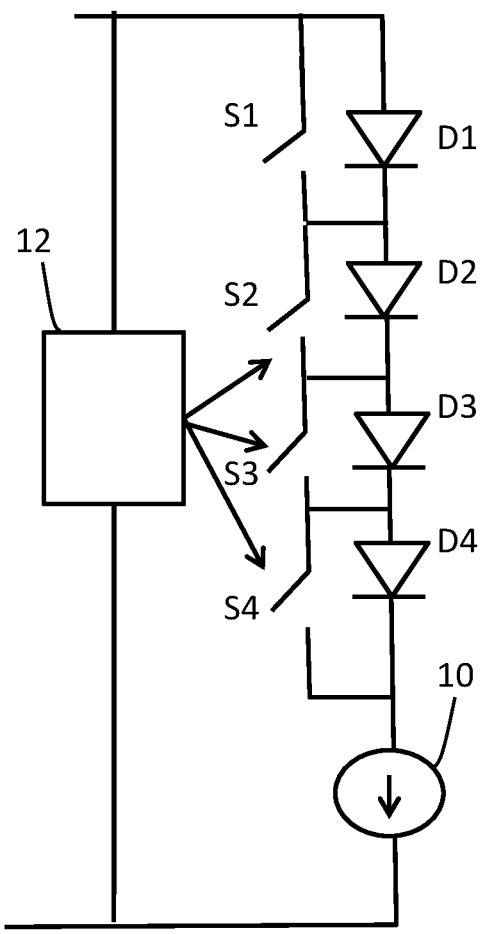
FIG. 1 shows a known tapped linear driver architecture in simplified form.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a MOSFET circuit which clamps a MOSFET gate voltage (either directly or via a gate control circuit) when the source voltage exceeds a threshold level, for example in response to a voltage surge event between the source and drain. In particular, the gate is held at a voltage relative to the source, to turn off the first MOSFET during such a surge event, but not during normal operation. This provides automatic protection against unwanted increases in the input voltage, especially when the MOSFET was in its on state during the switching. A threshold circuit is connected between the gate (or a gate control node) and a reference voltage. When the voltage at the source exceeds a voltage threshold level, conduction is allowed between the source and the gate (or the gate control node), and conduction of the threshold circuit is also allowed.

FIG. 1 shows the basic stacked topology of a tapped linear driver, in simplified schematic form, to explain the general operating principle. The linear driver circuit receives as input a full wave rectified mains signal. The rectifier is not shown, but typically comprises a diode bridge circuit. A single current source 10 draws current through the LED string, which has sections D1, D2, D3, D4. Each section comprises one or more LEDs in series, and possibly also resistors.

The number of LEDs in each section may be the same or different to the other sections, and they may each be a collection of LEDs of the same color (with different sections being different colors). Alternatively, all LEDs may be the same color, or the sections may have LEDs of different colors.

All sections D1 to the last section D4 have a respective parallel bypass switch S1, S2, S3, S4 as shown (although the parallel bypass switch may be omitted for D1, in a version where D1 is always connected).

The switches are operated to match the voltage across the LED string (i.e. those sections which are not bypassed) to the mains voltage at a particular point in time during each rectified half period of the mains voltage cycle. The current source 10 supplies the LEDs with the required current (preferably a sine wave for low total harmonic distortion) corresponding to the power that is to be delivered to the LEDs.

The difference between the instantaneous rectified mains voltage and the LED voltage of the connected sections is dropped across the current source 10. In this way, the energy is dissipated across the current source 10.

One approach for controlling the switches S1 to S4 is to provide voltage-based control of the switches using a controller 12. The instantaneous input voltage is measured by the controller 12 and the switches are switched in order to match the input voltage and the summed LED section voltages. By doing so the losses in the linear current source 10 are minimized.

An alternative approach for controlling the switches S1 to S4 is to use current-based control the bypass switches are normally closed. They open when a current exceeds a certain pre-set level. In this way, voltage information is not required and the switching occurs based on the current that flows through the switch.

Similarly, for a switched mode power supply with a power commutation component like an inductor or a capacitor, a switch or switch arrangement is switched on and off in high frequency to control the power communication. This will be described in more detail by referring to FIG. 8.

To sum up, there are moments when the switch is on. When a surge comes at that moment, the surge will apply across the switch and this can cause damage to the switch.

Figure 2:
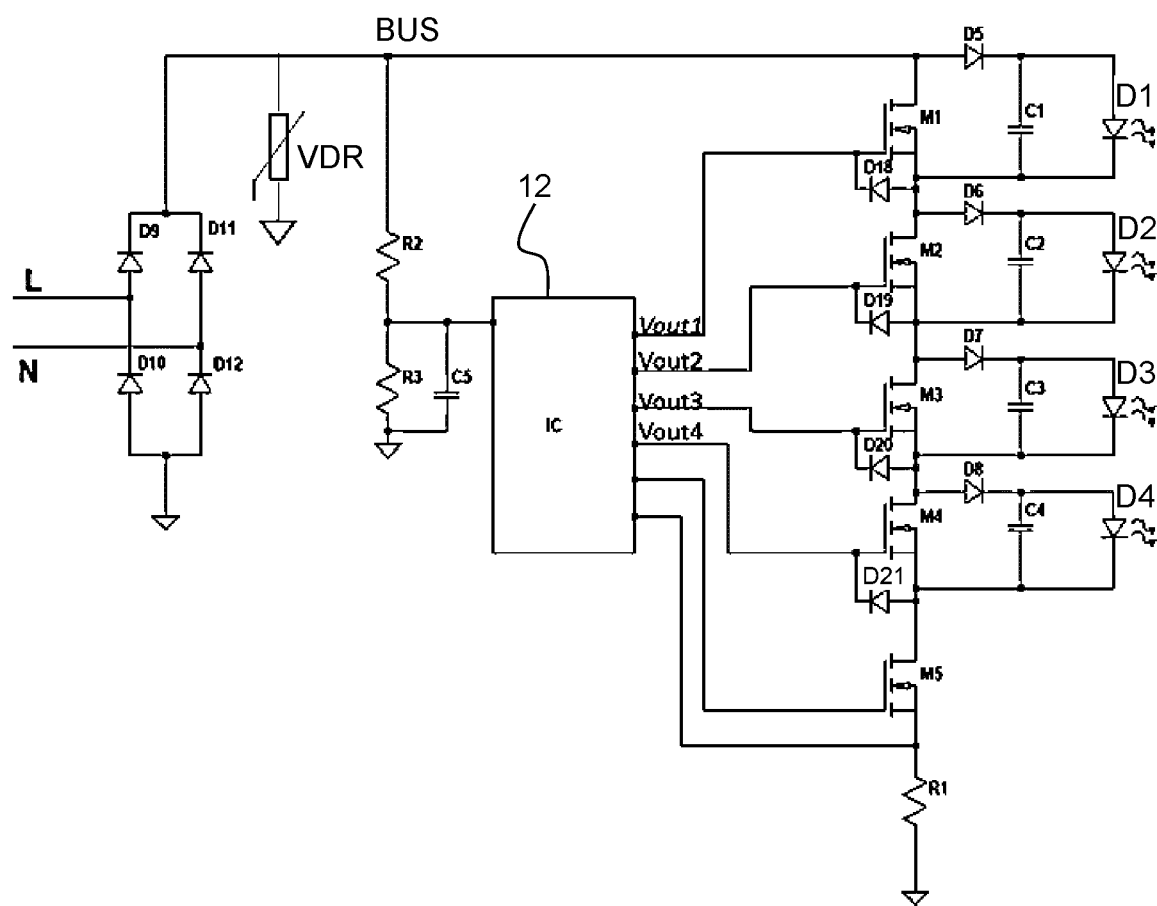
FIG. 2 shows an implementation of the circuit of FIG. 1 in more detail.

FIG. 2 shows an implementation of the circuit of FIG. 1 in more detail, and with voltage based control of the bypass switches.

Each LED section D1 to D4 has an associated parallel bypass switch implemented in this example as n-channel MOSFETs M1 to M4.

An issue of TLD circuits, and the stacked TLD in particular, is light flicker due to feeding the LEDs with pulsating DC current. A frequency of that pulsation is double the frequency of the mains voltage, namely 100 Hz or 120 Hz. This pulsation is seen as a light flicker.

Electrolytic capacitors C1 to C4 are added to address this issue, with one in parallel with each LED section D1 to D4. By doing so, both high power factor and low ripple of the LEDs are maintained.

The parallel capacitors C1 to C4 are decoupled by diodes D5 to D8. These are in series with the main light emitting diode sections D1 to D4, such that there is one decoupling diode at the junction between two adjacent LED sections. For example, decoupling diode D6 is in series between LED sections D1 and D2.

The drive current drawn by the current source charges the capacitors in parallel with the LED sections when the associated switch is non-conducting, and the capacitor is discharged to LED section when the switch is conducting. In this way, the pulsation of the current and hence the light flicker is reduced.

The decoupling diodes D5 to D8 that are in series with each switch prevent the capacitors discharging via the switches M1 to M4 when the switches are conducting, and when the LED section is being bypassed.

The circuit comprises a series connection of MOSFETs M1 to M4. Each MOSFET comprise a source, drain and gate. The first MOSFET M1 has its drain connected to the input voltage BUS. The last MOSFET M4 has its source connected to the current source 10, which is implemented as a further MOSFET M5, having its gate voltage controlled by the controller 12.

The gate of each MOSFET controls it conduction state. More generally, there is a gate control node to which a control signal is applied. In the case of FIG. 2, the gate control node is the actual gate, but as will be explained below there may be a circuit for each MOSFET which interfaces between a command signal for the control of the MOSFET and the actual gate.

Each bypass switch MOSFET M1 to M4 has a unidirectional circuit component, in particular a diode, connected in its forward conduction direction from the source to the gate (and more generally between the source and the gate control node). These diodes are shown as D18 to D21. They may be added circuit components or part of the MOSFET packages.

FIG. 2 additionally shows the input rectifier formed as a full diode bridge rectifier of diodes D9 to D12, receiving a live and neutral mains input, and delivering the rectified bus voltage BUS to the driver circuit.

A potential divider R2, R3 and filter capacitor C5 provide sensing of the instantaneous input voltage, which is used by the controller 12 to time the operation of the bypass switches M1 to M4. A current sense resistor R1 is used to generate a feedback voltage which is supplied to the controller 12 to enable control of the current source M5 to deliver a desired current.

A problem with this circuit is that the components, in particular the bypass switches M1 to M4, need to be designed to take account of a possible surge event.

For outdoor 10 kV surge applications, a surge protection device is typically provided in the luminaire. This limits the residual voltage input to the driver to a 2 kV residual voltage input. In known driver designs, this residual voltage is clamped to 794V in the bus line using a voltage dependent resistor VDR as shown in FIG. 2.

In this topology, the MOSFETs M1 to M4 are switching on and off according to a binary rule. During the switching period, the on state of the MOSFETs M1 to M4 may be defined as state '1' and the off state may be defined as state '0'. As the input mains voltage phase progresses from 0° to 90° (to the maximum) and then from 90° to 180°, the MOSFETs M1 to M4 switch from the binary states "0000" to "1111" then back from "1111" to "0000". Due to the rectification of the mains input, the same process arises for the mains voltage phase from 180° to 360°.

The drain to source voltage of MOSFETs M1 to M4 when turned on may be denoted as VM1*on* to VM4*on*. The drain to source voltage of M5 is denoted as VM5.

The residual bus voltage during a surge event may be denoted as Vbus.

The diode forward voltages may be denoted as VD5 to VD8 for the decoupling diodes and VD18 to VD21 for the source-gate diodes.

The voltages on the output control pins of the controller 12 are Vout1 to Vout4, and these voltages are applied to the gates of the MOSFETs M1 to M4.

A surge event may arise for any state of the MOSFETs M1 to M4. The worst state is "1111" with each of M1 to M4 turned on. In such a case, the voltages in the circuit may be:

$Vout1 = Vbus - VM1on - VD18 \approx Vbus$ $Vout2 = Vbus - VM1on - VM2on - VD19 \approx Vbus$ $Vout3 = Vbus - VM1on - VM2on - VM3on - VD20 \approx Vbus$ $Vout4 = Vbus - VM1on - VM2on - VM3on - VM4on - VD21 \approx Vbus$ $Vm5 = Vbus - (VM1on + \ldots + VM4on) - VR1 \approx Vbus$ The voltage of the current source MOSFET M5 thus follows Vbus from 0V (mains at zero phase angle) to close to the surge limit, in this example 794V.

As the drain to ground connection of M5 usually has large parasitic capacitors, and according to i(t)=C*(dv/dt), the bypass MOSFETs M1 to M4 will have a very large instantaneous shock current.

Thus, it can be seen that the voltage of the IC pins and the MOSFETs is close to the residual surge voltage Vbus, and a very large instantaneous shock current flows through the transistors M1 to M4.

The known approach to address this issue is to use a controller and MOSFETs which can withstand the residual surge voltage and select MOSFETs which can withstand the surge currents. This increases the cost and needs more space.

Figure 3:
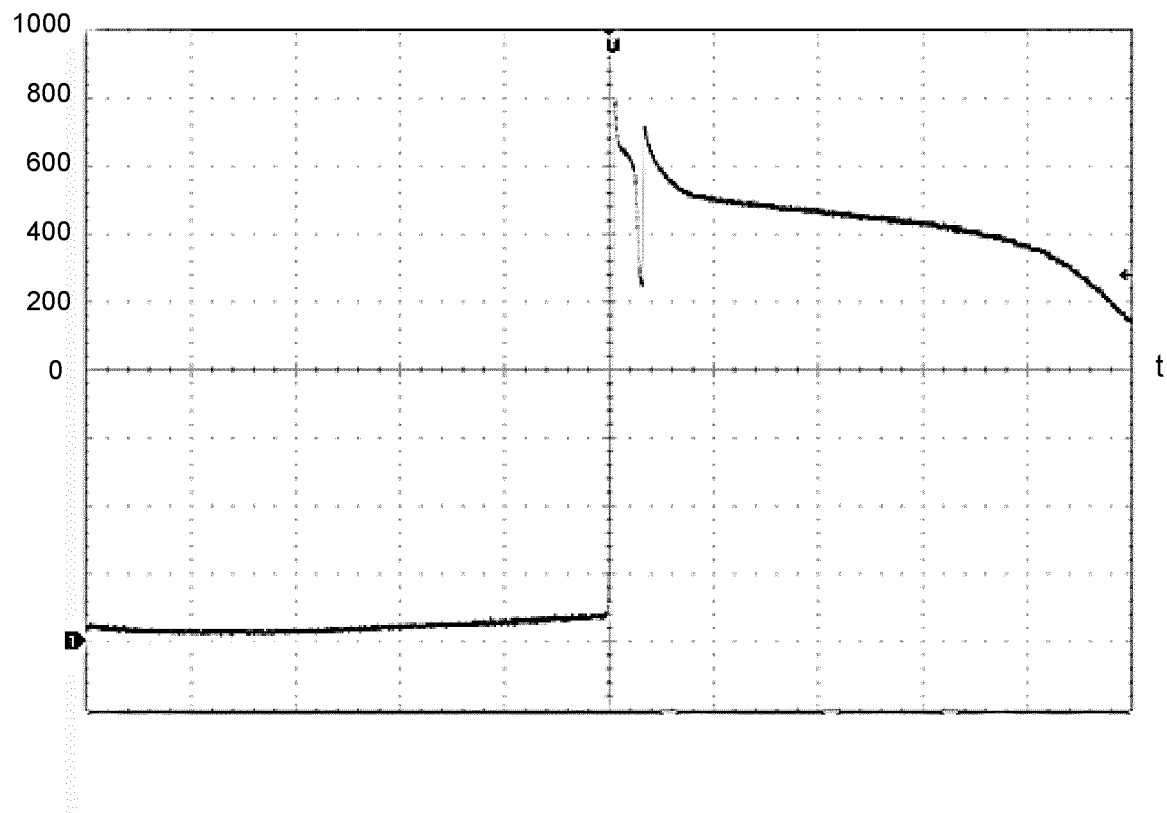
FIG. 3 shows one of the output voltages of the controller by way of example, before and after a surge event.

FIG. 3 shows the voltage Vout1 by way of example, before and after a surge event.

It can be seen that the surge event results in the residual surge voltage (e.g. 794V) at the pin Vout1.

Figure 4:
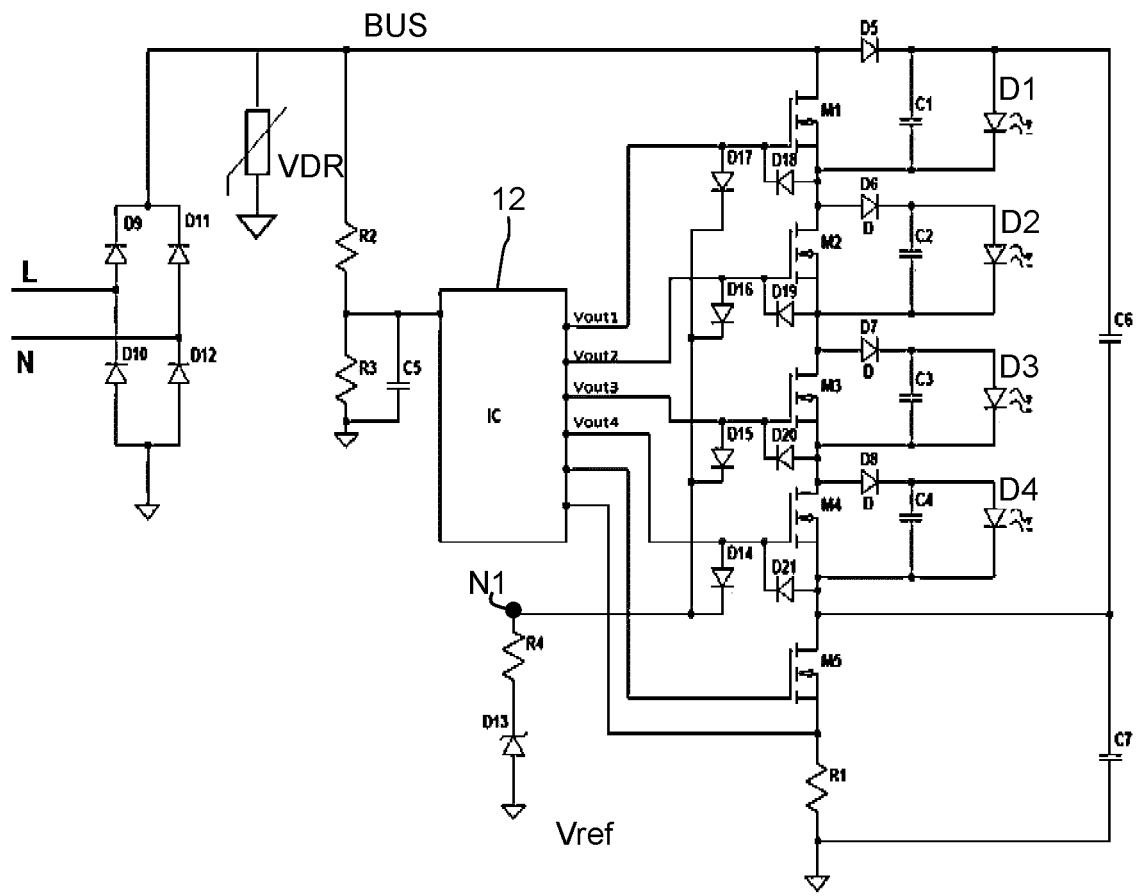
FIG. 4 shows a modification to the circuit of FIG. 2 in accordance with an example of the invention and based on n-channel MOSFETs.

FIG. 4 shows a modification to the circuit of FIG. 2 in accordance with an example of the invention. The same components as in FIG. 2 are given the same references and a description is not repeated.

The modification compared to FIG. 2 is to add a threshold circuit between the gate of each bypass MOSFET M1 to M4 (and hence more generally, the gate control node as explained above) and a reference voltage Vref.

The threshold circuit comprises a Zener diode D13 which connects to the reference voltage and a current limiting resistor R4 in series with the Zener diode. D13 for example has a 350V threshold voltage. R4 has a resistance below 10 kΩ and is a surge resistor. A node N1 is defined at the terminal of resistor R4 opposite the Zener diode D13. This node N1 connects to the gate of each bypass MOSFET M1 to M4 through a respective further unidirectional circuit component, e.g. diode, D14 to D17. These will be termed clamping diodes in the description below.

The overall threshold circuit is thus connected between the gate of each bypass MOSFET M1 to M4 and the reference voltage Vref. The threshold circuit clamps the voltage at the gate of each MOSFET to a clamping voltage level (which depends primarily on the threshold of the Zener diode D13, i.e. ignoring the effect of R4). This clamping takes place when the voltage at the source of the respective MOSFET exceeds a respective voltage threshold level. This threshold voltage level is sufficient for the associated source-gate diode D18 to D21 to become conductive in the direction from source to gate, and for the associated clamping diode D14 to D17 to become conductive. Each source is thus connected to the node N1 through two diodes (e.g. D18 and D17) which are in series with the same polarity, i.e. with their forward conduction direction from the source to the node N1.

The threshold circuit is in particular adapted to clamp the voltage at the gate in response to a surge event of the input voltage. However, normal operating voltages of the circuit do not result in source voltages which are sufficient to turn on the clamping diodes D14 to D17.

Forward conduction is enabled through the respective unidirectional circuit component (D18 to D21) and conduction of the threshold circuit, in particular the respective clamping diode (D14 to D17) and the shared Zener diode D13. This turns off the respective MOSFET because the gate is at a lower voltage that the source (by an amount corresponding to the voltage drop across diodes D18 to D21).

Any MOSFET which is conducting at the time of a surge event will switch to a non-conducting state. Thus, all MOSFETs will be turned off in response to a surge event, no matter what the initial combination of switch states.

The threshold circuit enables an increase in input voltage to be shared across the multiple MOSFETs (including the current source MOSFET M5), so that the voltage handling capability of each individual MOSFET can be reduced. It provides a low cost, space saving solution, which can also improve EMI (electromagnetic interference) performance, THD (total harmonic distortion) and high potential performance.

FIG. 4 also shows a capacitor arrangement between the input voltage BUS and ground. The capacitor arrangement comprises a first capacitor C6 in a parallel with the whole LED string and a second capacitor C7 in parallel with the current source circuit M5.

Capacitor C6 is a bypass and EMC capacitor. When a surge event is generated C6 can bypass current from the MOSFETs M1 to M4 to reduce the instantaneous shock current. During normal operation, C6 is charged and discharged for improving EMC.

C7 is used to divide the input voltage with C6. When a surge event is generated the voltage division means that VM5 can be close to Vbus-VD1-VD2-VD3-VD4, meanwhile it also reduces the current through M1 to M4. The Vbus maximum voltage is known and, based on this, suitable capacitance values for C6 and C7 can be set.

C7 also can improve EMC and THD. The switching on and off of MOSFETs M1 to M4 will produce impulse voltages and currents, so C7 functions as an absorbing capacitor, to limit the rate of change of current and voltage.

The circuit operates to turn off the transistors when there is a surge event. To analyze the circuit operation, in addition to the definitions above, the drain-source voltages of the bypass MOSFETs M1 to M4 when turned off may be defined as VM1off to VM4off, and the voltage across capacitors C1 to C4 are defined as VC1 to VC4. This gives:

$$VM1off = VD5 + VC1 \approx VD1$$

$$VM2off = VD6 + VC2 \approx VD2$$

$$VM3off = VD7 + VC3 \approx VD3$$

$$VM4off = VD8 + VC4 \approx VD4$$

When the driver is working normally, the voltage at node N1 is less than 350V so there is no current through D13.

When the surge event is generated, if M1 is on at that moment, the source voltage of M1 will quickly rise above 350V. The gate voltage of M1 will quickly rise above 350V so that the path to ground of D18, D17, R4, D13 will connect such that there is a current path from the gate of M1 to ground. As soon as this current flows, the gate voltage will drop below the source voltage so the MOSFET M1 will turn off.

In the same way:
D16, R4, D13 provide a turn off path for M2;
D15, R4, D13 provide a turn off path for M3; and
D14, R4, D13 provide a turn off path for M4.

In each case, the turn off path is active when the respective MOSFET source voltage rises above a threshold voltage. This threshold voltage is for example two diode forward voltages above the threshold voltage of the Zener diode D13, i.e. 350V+1.4V.

The resistor limits the current to ground and thereby ensures the components in the loop are not broken, and the gate to source voltage of the MOSFETs M1 to M4 does not exceed a breakdown voltage.

Thus, when Vout1–Vout4 (corresponding to the gate voltages of M1 to M4) exceed the clamping voltage (by more than the forward threshold of the diodes D14 to D17) D14 to D17 conduct, and current flows through R4 and D13 to ground, and MOSFETs M1 to M4 switch off.

When switched off, the following voltages arise:

$$Vout1 = Vbus - VM1off - VD18 \approx Vbus - VD1$$

$$Vout2 = Vbus - VM1off - VM2off - VD19 \approx Vbus - VD1 - VD2$$

$$Vout3 = Vbus - VM1off - VM2off - VM3off - VD20 \approx Vbus - VD1 - VD2 - VD3$$

$$Vout4 = Vbus - VM1off - VM2off - VM3off - VM4off - VD21 \approx Vbus - VD1 - VD2 - VD3 - VD4$$

$$VM5 = Vbus - VM1off - VM2off - VM3off - VM4off \approx Vbus - VD1 - VD2 - VD3 - VD4$$

Assuming an input voltage of 230 VAC, and a surge residual voltage Vbus of 794V, this gives:

$$VD1 \approx 144V$$

$$VD2 \approx 72V$$

$$VD3 \approx 36V$$

$$VD4 \approx 18V$$

Thus:

$$Vout1 \approx Vbus - VD1 = 794V - 144V = 650V$$

$$Vout2 \approx Vbus - VD1 - VD2 = 794V - 144V - 72V = 578V$$

$$Vout3 \approx Vbus - VD1 - VD2 - VD3 = 794V - 144V - 72V - 36V = 542V$$

$$Vout4 \approx Vbus - VD1 - VD2 - VD3 - VD4 = 794V - 144V - 72V - 36V - 18V = 524V$$

$$VM5 \approx Vbus - VD1 - VD2 - VD3 - VD4 = 794V - 144V - 72V - 36V - 18V = 524V$$

Figure 5:
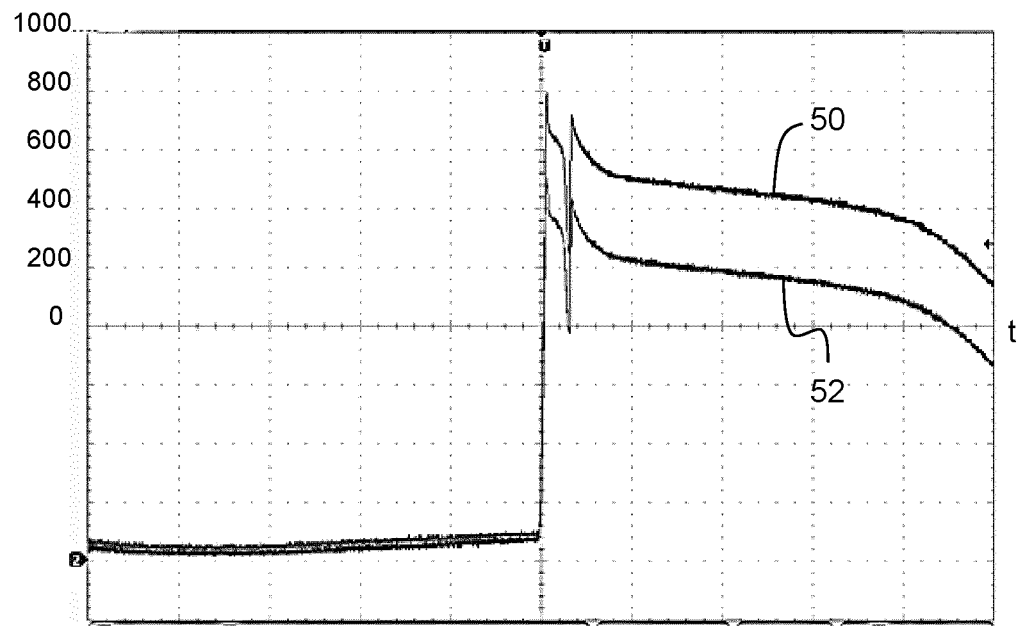
FIG. 5 shows the same plot as FIG. 3 for the circuit of FIG. 4.

FIG. 5 shows as plot 50 the same plot as FIG. 3. Plot 52 is for Vout1 using the circuit of FIG. 4.

Figure 6:
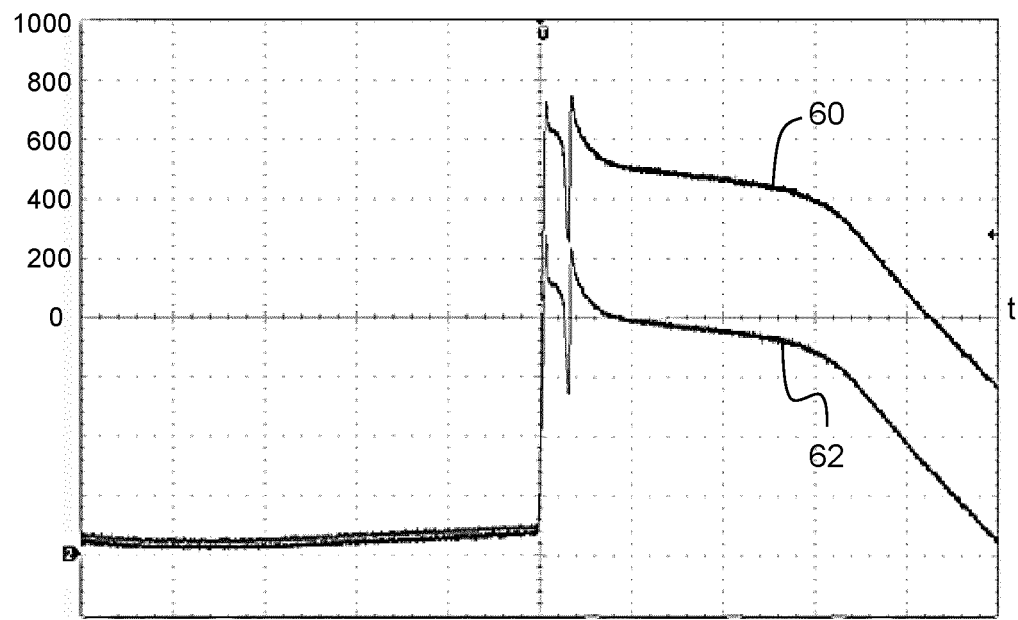
FIG. 6 shows the voltage across the current source for the circuit of FIG. 2 and for the circuit of FIG. 4.

FIG. 6 shows as plot 60 the voltage VM5 for the circuit of FIG. 2 and as plot 62 the voltage VM5 for the circuit of FIG. 4.

The invention avoids the need to reduce the clamping voltage provided by the voltage dependent resistor VDR. This is undesirable because there may then be a potential component breakdown from the normal mains voltages. The lower the clamping voltage, the more components are needed.

It can be seen from the analysis above that the different MOSFETs may have different voltage ratings.

For example, MOSFET M1 is clamped with D5, C1 and D1 (in parallel), M2 is clamped with D6, C2 and D2, and so on. The diodes D1 to D4 have different voltages.

By way of example, for a 230 VAC input voltage, the source-drain voltage ratings can be 200V for M1, 100V for M2, 60V for M3 and 30V for M4.

The example above used tapped linear driver which switches the LED according to the instantaneous amplitude of the input voltage to describe the invention. Note that the invention can also be applied to simple linear driver wherein the LED is not switched but fixed.

Figure 7:
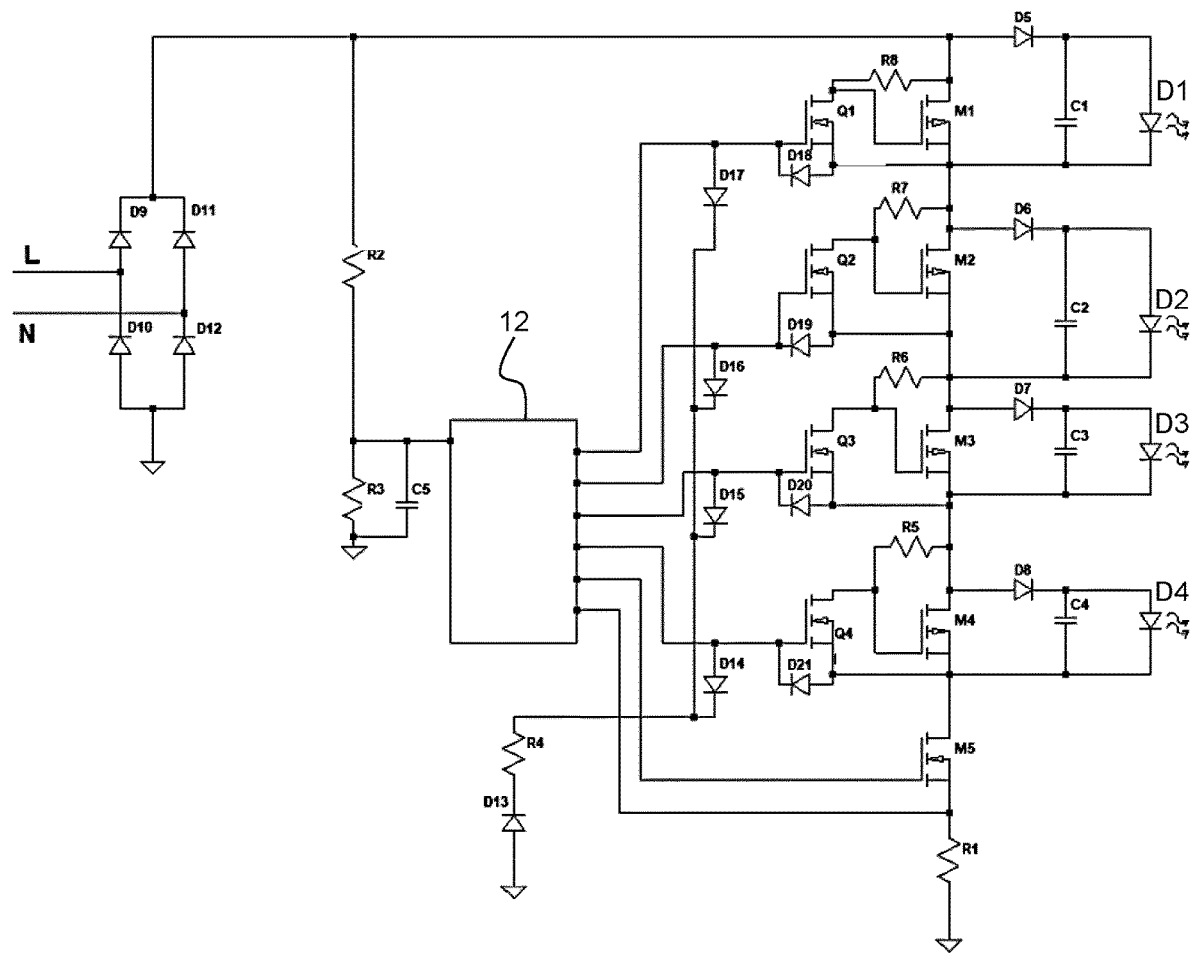
FIG. 7 shows a modification to a p-channel version of the circuit of FIG. 2 in accordance with an example of the invention.

The example above is based on an n-channel MOSFET circuit. However, the same concepts may be applied to a p-channel MOSFET circuit, as shown in FIG. 7.

The same components as in FIG. 4 are given the same reference numbers and the description is not repeated. The MOSFETs M1 to M4 are now p-channel devices.

This means that if the gate is pulled down to a low reference, the p-channel MOSFET will turn on, which is the opposite function to that which is desired. Thus, each MOSFET M1 to M4 has a gate control circuit which connects to the gate of the MOSFET. The gate control circuit comprises a small n-channel MOSFET, Q1 to Q4, and a pull up resistor R5 to R8. The pull up resistors are between the drain and gate of the respective p-channel MOSFETs. The input to the gate control circuit is the gate control node, and the threshold circuit diodes D14 to D17 connect between this gate control node and the reference voltage. The diodes D18 to D21 connect between the source and the respective gate control node.

When the source is pulled high, there is again a conduction path through the two diodes, e.g. from the source of M1, through diode D18 and through diode D17. This pulls down the gate of Q1 which turns it off. The pull up resistor R8 then pulls the gate of the MOSFET M1 up to the drain voltage, which turns off the p-channel MOSFET M1.

The circuit function is otherwise as described above. Thus, it can be seen that the concept of the invention may be applied to n-channel MOSFET circuits and to p-channel MOSFET circuits.

The invention has been described above in connection with an n-channel TLD circuit and a p-channel TLD circuit. However, the invention applies more generally to MOSFET circuits which may be exposed to voltage surges, and particularly when there is a series connection of MOSFETs. The invention then enables the residual voltage which appears at circuit nodes to be reduced and/or allows the residual voltage to be shared between the multiple MOSFETs.

Figure 8:
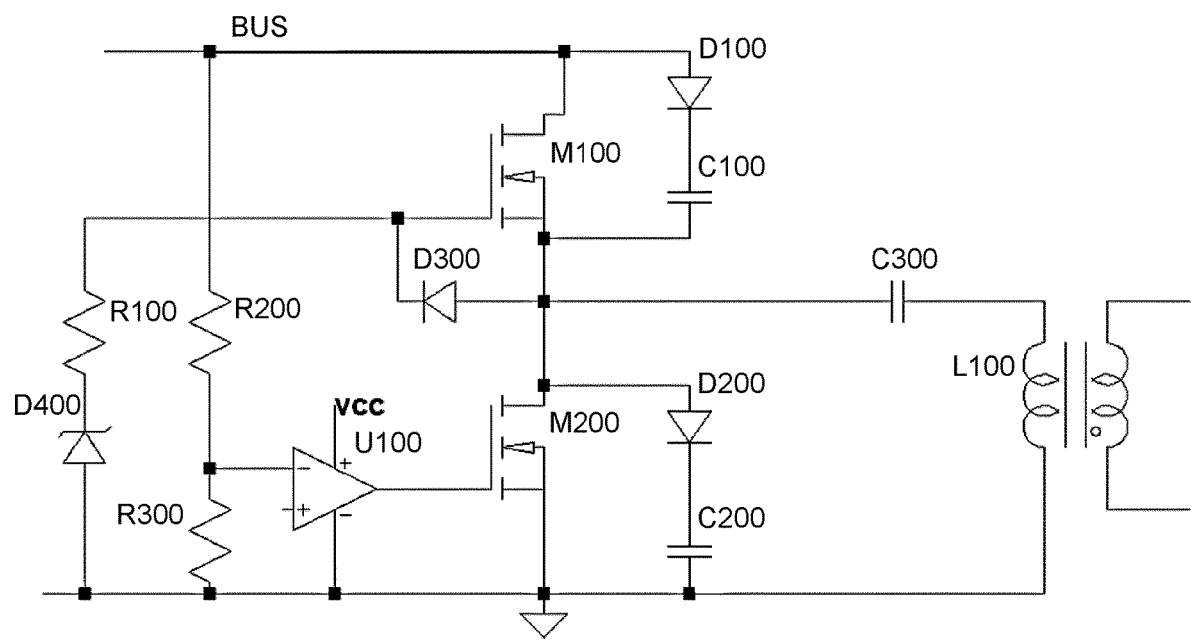
FIG. 8 shows a half bridge-based resonate converter circuit to which the invention has been applied.

FIG. 8 shows an example of a half bridge-based switch mode power supply, to which the concept of the invention has been applied. The circuit comprises a half bridge comprising a pull up n-channel MOSFET M100 and a pull down n-channel MOSFET M200. The two MOSFETs are in series between the input, BUS, and ground. The junction between them connects to an LC circuit of capacitor C300 and inductor L100. The inductor L100 is the primary side of an isolating transformer. The secondary side connects to the load, not shown.

The circuitry for generating the normal control signals to be applied to the gates of the MOSFETs is not shown. These are high frequency switching signals. FIG. 8 only shows the circuit components that are added for surge protection. Basically, the two MOSFET are alternatively turned on/off.

When MOSFET M100 is turned on, and surge comes, the surge may damage it. The pull up MOSFET M100 has the same threshold circuit as described above, comprising a unidirectional circuit component, e.g. diode, D300 connected between the source and gate (the gate itself is the gate control node in this circuit). The threshold circuit of a Zener diode D400 and resistor R100 is connected between the gate and ground, functioning as a reference voltage. The pull up MOSFET is turned off in response to a surge event, in the same way as explained above, by conduction through D300 and D400.

The pull down MOSFET M200 is also turned off by the surge event, either the MOSFET M100 was in on state or off state. Because the source is connected to a fixed reference, i.e. ground, a different shut down circuit is used. The gate of the pull down MOSFET M200 is controlled by an opamp U100. The inverting input is provided with a scaled version of the input voltage, BUS, by a resistor divider R200, R300. When the input, BUS, is high, the inverting input rises above a reference voltage at the non-inverting input, so that the output of the opamp U100 is pulled low and turns off the pull down MOSFET M200.

In the event of a surge event, the input voltage, BUS, is divided into two parts, so that the drain source voltage of the two MOSFETs will be limited to half the residual surge voltage, and lower voltage components may thus be used.

The MOSFETs each have a diode and capacitor D100, C100, D200, C200 in parallel to provide a conduction path during the surge event.

FIG. 8 is just one simplified example of a switch mode power supply circuit, as one example of MOSFET circuit which is not a tapped linear driver circuit. This shows that the invention has general applicability to MOSFET circuits designed to tolerate surge events.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A MOSFET circuit, comprising:
   a first MOSFET comprising a drain connected to an input voltage, a gate and a source;
   a unidirectional circuit component connected between the source and a gate control node, which gate control node controls the switching of the first MOSFET using the gate; and
   a threshold circuit connected between the gate control node and a reference voltage,
   wherein the threshold circuit is adapted to clamp the voltage at the gate control node to a clamping voltage level, when the voltage at the source exceeds a voltage threshold level, and cause the unidirectional circuit component become conductive in the direction from the source to the gate control node and allow a conduction of the threshold circuit, thereby holding the gate control node at a voltage such as to turn off the first MOSFET.

2. A MOSFET circuit as claimed in claim 1, wherein the unidirectional circuit component is connected in its forward conduction direction between the source and the gate control node, wherein the threshold circuit is adapted to clamp the voltage at the gate control node to a clamping voltage level when the voltage at the source exceeds a voltage threshold level, by enabling forward conduction through the unidirectional circuit component from the source to the gate control node, and
wherein said threshold circuit is decoupled from the input voltage.

3. MOSFET circuit as claimed in claim 1, wherein the first MOSFET is n-channel and the gate control node is the gate, wherein conduction through the unidirectional circuit component and conduction of the threshold circuit, holds the gate at a voltage below the voltage at the source.

4. The MOSFET circuit as claimed in claim 1, wherein the first MOSFET is p-channel, and wherein the first MOSFET has a gate drive circuit comprising an n-channel gate drive MOSFET, wherein the gate control node is the gate of the gate drive MOSFET, wherein conduction through the unidirectional circuit component and conduction of the threshold circuit turns off the gate drive MOSFET, thereby to turn off the first MOSFET.

5. The MOSFET circuit as claimed in claim 1, wherein:
the unidirectional circuit component comprises a diode; and/or the threshold circuit comprises a Zener diode.

6. A MOSFET circuit as claimed in claim 1, comprising a series connection of a plurality of MOSFETs including the first MOSFET,
wherein the circuit comprises a plurality of unidirectional circuit components, each connected between the source and the gate control node of a respective one of the MOSFETs,
wherein the threshold circuit is connected between the gate control node of each MOSFET and the reference voltage,
and wherein the threshold circuit adapted to clamp the voltage at the gate control node of each MOSFET to the clamping voltage level when the voltage at the source of the respective MOSFET exceeds a respective voltage threshold level, thereby enabling forward conduction through the respective unidirectional circuit component and conduction of the threshold circuit, and thereby to turn off the respective MOSFET.

7. The MOSFET circuit as claimed in claim 6, wherein the threshold circuit comprises a shared Zener diode which is connected to the gate control node of each MOSFET through a respective further unidirectional circuit component.

8. A tapped linear LED driver, comprising:
a LED string comprising a set of LED sections in series;
a MOSFET circuit as claimed in claim 6, wherein each LED section is associated with a respective one of the plurality of the MOSFETs, wherein each MOSFET provides a bypass current path for the associated LED section; and
a controller for controlling the gate voltages of the MOSFETs in dependence on an instantaneous amplitude of the input voltage, in order to bypass at least one of the LED sections to present a forward voltage of the not-bypassed LED sections matching the instantaneous amplitude of the input voltage.

9. The tapped linear LED driver as claimed in claim 8, further comprising a respective capacitor in parallel with each LED section, and a diode between the associated MOSFET and the parallel circuit of the capacitor and LED section.

10. The tapped linear LED driver as claimed in claim 8, further comprising a rectifier, wherein the rectifier comprises an input for receiving an AC voltage and an output of the rectifier output comprises the input voltage for the MOSFET circuit.

11. The tapped linear LED driver as claimed in claim 8, further comprising a current source circuit in series with the LED string, wherein the controller is further configured for controlling the current source circuit.

12. The tapped linear LED driver as claimed claim 8, further comprising a capacitor arrangement between the input voltage and ground.

13. The tapped linear LED driver as claimed in claim 12, wherein the capacitor arrangement comprises a first capacitor in a parallel with the whole LED string and a second capacitor in parallel with the current source circuit.

14. A surge protection method for a MOSFET circuit, wherein the MOSFET circuit comprises:
a first MOSFET comprising a drain connected to an input voltage a gate and a source;
a unidirectional circuit component connected between the source and a gate control node, which gate control node controls the switching of the first MOSFET using the gate; and
a threshold circuit connected between the gate control node and a reference voltage and decoupled from the input voltage,
wherein the method comprises:
performing voltage clamping of the voltage at the gate control node to a clamping voltage level, using the threshold circuit, when the voltage at the source exceeds a threshold voltage level and cause the unidirectional circuit component become conductive in the direction from the source to the gate control node and allow a conductive of the threshold circuit, thereby holding the gate control node at a voltage such as to turn off the first MOSFET.

15. The surge protection method of claim 14 applied to a tapped linear LED driver, wherein the tapped linear driver comprises an LED string comprising a set of LED sections, wherein each LED section is associated with a respective MOSFET of the MOSFET circuit, and
wherein the method comprises performing voltage clamping of the voltage at the gate control node of each MOSFET to the clamping voltage level when the voltage at the source of the respective MOSFET exceeds a respective threshold voltage level in case of an surge event in the input voltage.

* * * * *